United States Patent [19]

Kitajima et al.

[11] Patent Number: 4,947,202

[45] Date of Patent: Aug. 7, 1990

[54] DISTANCE MEASURING APPARATUS OF A CAMERA

[75] Inventors: Tomoya Kitajima, Kawasaki; Akira Suzuki, Yokohama, both of Japan

[73] Assignee: Ricoh Company, Ltd., Tokyo, Japan

[21] Appl. No.: 375,986

[22] Filed: Jul. 6, 1989

[30] Foreign Application Priority Data

Jul. 7, 1988 [JP] Japan ................. 63-167673

[51] Int. Cl.$^5$ .................. G03B 3/00; G01C 3/08
[52] U.S. Cl. ...................... 354/403; 356/1; 356/4
[58] Field of Search ............... 354/403, 408; 356/1, 356/4

[56] References Cited

U.S. PATENT DOCUMENTS 4,257,705 3/1981 Hosoe et al. .................. 356/1

FOREIGN PATENT DOCUMENTS 58-87543 5/1983 Japan.
0296126 12/1987 Japan ........................ 354/403

Primary Examiner—W. B. Perkey
Attorney, Agent, or Firm—Oblon, Spivak, McClelland, Maier & Neustadt

[57] ABSTRACT

A distance measuring apparatus of a camera is capable of performing passive and active distance measurements. A pair of light-receiving optical systems for forming images of an object in focus on respective light-detecting elements are adapted to define symmetrical light-receiving optical paths, respectively. A pair of first light beams transmitted from infinity are symmetrically incident on the light-detecting elements at one ends thereof, respectively. A pair of second light beams transmitted from a limit position which defines a measurable shortest object distance in a passive distance measurement, are incident on the light-detecting elements at the other ends thereof, respectively. A light-emitting unit for emitting an auxiliary light beam toward an object has a light-emitting optical axis which is arranged in a plane including the light-receiving optical axes of the light-receiving optical systems so that it passes through the limit position in at least either of the light-receiving optical paths. The auxiliary light beam reflected by an object which is located at the shorter distance side of the limit position, can be detected by at least either of the light-detecting elements.

10 Claims, 8 Drawing Sheets

DISTANCE MEASURING APPARATUS OF A CAMERA

BACKGROUND OF THE INVENTION

The present invention relates to a distance measuring apparatus of a camera. More particularly, the invention relates to a distance measuring apparatus of a camera for performing passive and active distance measurements based on a triangulation method.

Conventionally, the principle of a triangulation method has been applied, as a means for measuring a distance to an object to be photographed, to a camera. Known distance measuring methods using the principle of a triangulation method can be roughly classified into two categories: a passive distance measuring method in which natural light reflected from an object to be photographed is used, and an active distance measuring method in which an auxiliary light beam emitted from a light-emitting unit toward an object to be photographed is used.

As disclosed in Japanese Patent Laying Open Publication No. 62-182613, in a known distance measuring apparatus using the passive distance measuring method (referred to as passive distance measuring apparatus, hereinafter), two images of an object to be photographed are focused on the two light-detecting elements, such as charge coupled device (CCD) or bucket brigade device (BBD), by a pair of symmetrical light-receiving optical systems, respectively. The pair of light-receiving optical systems have light-receiving optical axes, respectively, which are spaced with a predetermined base-line length from each other. The two images formed in focus on the respective light-detecting elements are converted to electric signals, respectively, which are then compared with each other for the measurement of distance to the object.

The passive distance measuring apparatus is able to cover the wide range of measurable object distances from a measurable shortest object distance to infinity. However, since there are restrictions in the size of the constituent elements of the light-emitting optical systems and, particularly, in the size of the image receiving elements, the passive distance measuring apparatus has a first deficiency in that it is impossible to sufficiently decrease the measurable shortest object distance. Further, the passive distance measuring apparatus has a second deficiency in that when an object to be photographed is a wall or the like which inherently causes an image thereof to be detected by the light-detecting elements without sufficient contrast of light, or when the intensity of natural light around an object to be photographed is too weak to cause an image thereof to be detected by the light-detecting elements without sufficient contrast of light, it is impossible to measure the distance to the object.

On the other hand, in a known distance measuring apparatus using the active distance measuring method (referred to as active distance measuring apparatus, hereinafter), an auxiliary light beam emitted from the light-emitting unit is irradiated to an object to be photographed, and thus the auxiliary light beam reflected by the object is then detected in position by the light-detecting element. Accordingly, the active distance measuring apparatus is able to cover the above-mentioned second deficiency of the passive distance measuring apparatus. However, since there is a restriction in the intensity of the auxiliary light beam emitted from the light-emitting unit, the active distance measuring apparatus has a deficiency in that it is impossible to sufficiently increase a measurable longest object distance.

Accordingly, when only one of the passive and active distance measuring apparatuses are used in the camera, it is impossible to attain satisfactory distance measurement.

In view of the above-mentioned deficiencies of the passive and active distance apparatuses, variable combinations of the passive and active distance measuring apparatuses have been proposed.

For example, Japanese Patent Laying Open Publication Nos. 60-53909, 60-53190, and 60-68307 (referred to as first references, hereinafter) disclose a distance measuring apparatus in which a passive distance measuring unit and an active distance measuring unit, as well as an additional distance measuring unit of a lens fixing type for fixing a photographing lens at a predetermined position, are used in combination with each other. However, since the three kinds of distance measuring units are independently incorporated into the camera, the apparatus disclosed in the first references has a disadvantage in that considerably large space for accommodating them are required in the camera body, and the manufacturing cost thereof is increased.

On the other hand, Japanese Patent Laying Open Publication Nos. 56-143904 and 58-100807 (referred to as second references, hereinafter) disclose a distance measuring apparatus in which a light-emitting unit for emitting an auxiliary light beam is incorporated into a passive distance measuring unit. Accordingly, the apparatus disclosed in the second references can be decreased in size in comparison to the apparatus shown in the first references. Further, in the apparatus disclosed in the second references, as well as that shown in the first references, the above-mentioned second deficiency of the passive distance measuring unit can be covered by the active distance measurement.

However, the second references neither disclose nor suggest means for solving the above-mentioned first deficiency of the passive distance measuring unit.

SUMMARY OF THE INVENTION

Therefore, it is an object to provide a distance measuring apparatus of a camera, which makes it possible to cover the deficiencies of a passive distance measurement by an active distance measurement, thereby making it possible to perform the measurement of object distances, which are shorter than a measurable shortest object distance in the passive distance measurement, without increasing the mounting space thereof in the camera, with a simple construction thereof.

Further object of the invention is to provide a distance measuring apparatus of a camera, which makes it possible to cover the deficiencies of a passive distance measurement by an active distance measurement, thereby making it possible to perform the measurement of object distances, which are shorter than a measurable shortest object distance in the passive distance measurement, without increasing the mounting space thereof in the camera, with a simple construction and increase accuracy of the distance measurement.

Another object of the invention is to provide a distance measuring apparatus of a camera, which can perform the reliable measurement of object distances within the range of measurable object distances in the passive distance measurement, by the use of an auxiliary light beam, while enabling the measurement of object distances, which are shorter than a measurable shortest object distance in the passive distance measurement, without increasing the mounting space thereof in the camera, with a simple construction thereof.

The object of the invention can be achieved by a distance measuring apparatus of a camera for performing passive and active distance measurements, comprising: a pair of light-detecting elements each having a light-receiving portion, which are symmetrically arranged with respect to an imaginary center axis and perpendicularly thereto; a pair of light-receiving optical systems for forming images of an object, which is to be photographed, in focus on the respective light-receiving portions of the light-detecting elements, the light-receiving optical systems being adapted to define symmetrical light-receiving optical paths, respectively, so that a pair of first light beams transmitted from infinity can be symmetrically incident on the light-receiving portions of the light-detecting elements at one of opposite ends thereof, respectively, and so that a pair of second light beams transmitted from a limit position which defines a measurable shortest object distance in the passive distance measurement, are incident on the light-receiving portions of the light-detecting elements at the other ends thereof, respectively; and a light-emitting unit for emitting an auxiliary light beam toward an object to be photographed so that the auxiliary light beam reflected by the object can be detected by at least either of the light-detecting elements, the light-emitting unit having a light-emitting optical axis which is arranged in a plane including light-receiving optical axes of the light-receiving optical systems so that the light-emitting optical axis passes through the limit position in at least either of the light-receiving optical paths.

According to the distance measuring apparatus having the above-mentioned construction, in the passive distance measurment, two images of an object which is located within the region between infinity and the limit position defining the measurable shortest object distance in the passive distance measurement are formed in focus on the respective light-receiving portions of the light-detecting elements. Accordingly, it is possible to measure the object distance from the camera to the object by detecting the relationship between the respective positions of the two images on the light-detecting elements.

On the other hand, according to the above-mentioned construction of the distance measuring apparatus, the light-emitting optical axis is able to intersect with one of light-receiving optical paths of the light-receiving optical systems at least a region between the limit position in the passive distance measurement and a predetermined shortest distance position between the camera and the limit position. Accordingly, in the active distance measurement, when an object to be photographed is located on the light-emitting optical axis within at least one of the light-receiving optical paths of the light-receiving optical systems between the camera and the limit position, the auxiliary light beam reflected from the object can be incident on the light-receiving portion of the corresponding light-detecting element. Accordingly, it is possible to measure the object distance from the camera to the object by detecting the incident position by detecting the incident position of the reflected auxiliary light beam with respect to the light-receiving portion of the corresponding light-detecting element.

Further, in the above-mentioned construction of the present invention, since the light-receiving optical system and the light-detecting elements used for the passive distance measurement are also used for the active distance measurement, it is only necessary for the active distance measurement to additionally provide the light-emitting unit. This means that the distance measuring apparatus having a simple construction can be easily and cheaply fabricated without increasing the size thereof.

Accordingly, it is possible, according to the present invention, to provide the distance measuring apparatus which makes it possible to cover the deficiencies of the passive distance measurement by the active distance measurement, thereby making it possible to perform measurement of object distances, which are shorter than the measurable shortest object distance in the passive distance measurement, without increasing the mounting space thereof in the camera, with a simple construction thereof.

In the present invention, the light-receiving optical axes of the light-receiving optical systems may be arranged so as to extend in parallel to the imaginary center axis. In this case, the light-emitting unit may be arranged so that the light-emitting optical axis thereof extends substantially in parallel to the light-receiving optical axes between one of the light-receiving optical axes of the light-receiving optical systems and the imaginary center axis.

On the other hand, the light-emitting unit may be arranged between the light-receiving optical axes of the light-receiving optical systems so that the light-emitting optical axis thereof passes through a point of intersection of the limit position and one of the light-receiving optical axes of the light-receiving optical systems. In this construction, it is impossible, for the detection of the auxiliary light beam reflected from the object, to use the whole of the light-receiving portion of the corresponding light-detecting element between the opposite ends thereof.

According to this construction, it is possible to cover the deficiencies of the passive distance measurement by the active distance measurement, thereby enabling the measurement of the object distances, which are shorter than the measurable shortest object distance in the passive distance measurement, without increasing the mounting space thereof in the camera, with a simple construction and increased accuracy thereof.

On the the hand, the light-emitting unit may be disposed out of the region between the light-receiving optical axes of the light-receiving optical systems. In this case, the light-emitting unit may be arranged so that the light-emitting optical axis thereof passes through a point of intersection of the second light beams. According to this construction, it is possible, by effectively utilizing the two light-detecting elements, to perform the reliable measurement of object distance within the range of the measurable object distances in the passive distance measurement, by the use of the auxiliary light beam, while enabling the measurement of the object distance which are shorter than the measurable shortest object distance in the passive distance measurement, without increasing the mounting space thereof in the camera, with a simple construction thereof.

Each of the light-detecting elements may be formed on the light-receiving portion thereof with a plurality of picture elements, each for producing an light detecting signal corresponding to the amount of light incident thereon, which are linearly arranged between the opposite ends of the light-receiving portion. In this case, the plurality of picture elements may be divided into a plurality of blocks so that each of the blocks includes a predetermined number of picture elements, and so that each of the blocks produces the same light detecting signal when the image of the object to be photographed is incident on at least any part of all the picture elements in the same block.

This construction makes it possible to seemingly enlarge the size of each of the light-detecting elements rather than the real physical size thereof. Accordingly, in this construction, it is possible to widen the measurable object distance in the active distance measurement toward the longer distance side of the limit position while enabling the measurement of the object distances which are shorter than the measurable shortest object distance in the passive distance measurement.

Further objects, features and advantages of the present invention will become apparent from the following description of the preferred embodiments as illustrated in the accompanying drawings.

DESCRIPTION OF THE PREFERRED EMBODIMENTS

Figure 1:
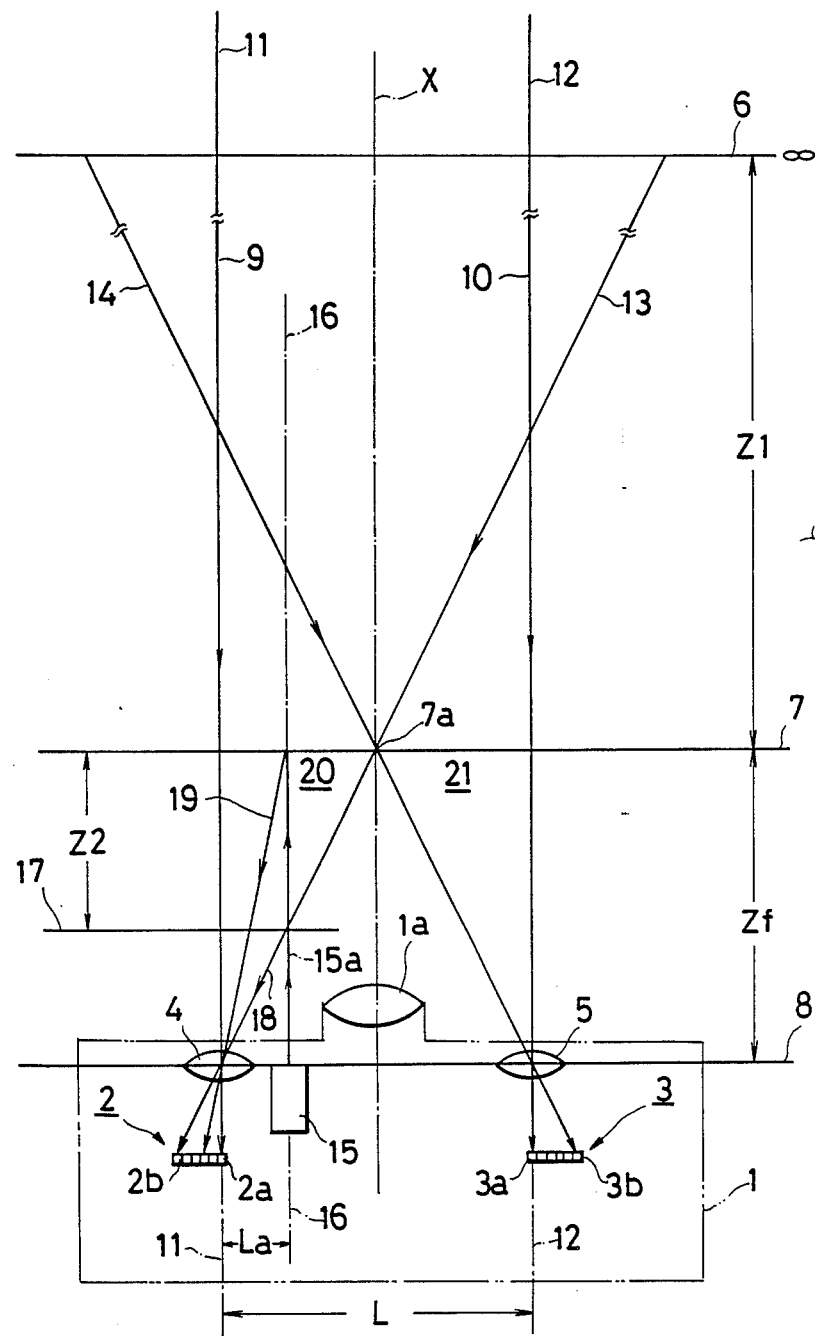
FIG. 1 is a diagrammatic plan view of the whole structure of a distance measuring apparatus according to a first embodiment of the present invention.

Preferred embodiments of the present invention will now be described in detail with reference to the accompanyinng drawings in which the same constituent elements are designated by the same reference numerals, respectively.

FIG. 1 is a plan view schematically illustrating a distance measuring apparatus according to a first embodiment of the present invention. The distance measuring apparatus incorporated in a body of a camera 1 is able to perform passive and active distance measurements.

In FIG. 1, reference numeral 1a designates a photographing lens of the camera 1, reference letter X designates an imaginary center axis of the camera 1, and reference numerals 2 and 3 designate sensor arrays as the light-receiving portions of light-detecting elements, respectively, which are symmetrically disposed with respect to the imaginary center axis X and extends perpendicularly to the imaginary center axis X.

In this embodiment, for the sake of simplicity of the description, each of the sensor arrays includes, as an example, six picture elements which are linearly arranged therein in a direction perpedicular to the imaginary center axis X. The sensor arrays 2 and 3 have inner ends, respectively, which are close to the imaginary center axis X, and outer ends which are apart from the imaginary center axis X.

Respectively located at the inner and outer ends of the sensor array 2 are opposite two of the six picture elements which are designated by 2a and 2b, and respectively located at the inner and outer ends of the sensor array 3 are opposite two of the six picture elements, which are designated by 3a and 3b.

Disposed in front of the sensor arrays 2 and 3 are focusing lenses 4 and 5 which are respectively spaced with a distance equal to the focal length of the lenses 4 and 5 from the sensor arrays 2 and 3. Designated by reference numeral 6 is a position of infinity (referred to as ∞ position, hereinafter), and designated by reference numeral 7 is a limit position which is a limit end of the short distance side of a distance-measurable range Z1 in which the distance to an object can be measured in the passive distance measurement. Reference numeral 7a designates a limit point as a point of intersection of the limit position 7 and the imaginary center axis X. Similarly, reference numeral 8 designates a reference position at which the lenses 4 and 5 are located, and reference letter Zf designates a distance-measurable range in which the distance to an object cannot be measured in the passive distance measurement.

Designated by reference numerals 9 and 10 are ∞ light beams as first light beams, respectively, which are reflected or irradiated from an object (not shown) located at the ∞ position 6 and arrive at the picture elements 2a and 3a through the lenses 4 and 5, respectively. Designated by reference numerals 11 and 12 are light-receiving optical axes of the lenses 4 and 5, respectively, which are coincident with the respective ∞ light beams 9 and 10. The light-receiving optical axes 11 and 12 of the lenses 4 and 5 are spaced from each other at a predetermined base-line length L.

Designated by reference numerals 13 and 14 are short-distance light beams as second light beams which pass through the limit point 7a, the lenses 4 and 5, and arrive at the picture elements 2b and 3b, respectively.

The above-described constituent elements together constitute a light-receiving optical system for performing the passive distance measurement.

Further, in FIG. 1, reference numeral 15 designates a light-emitting unit from which a light beam is emitted as an auxiliary light beam 15a along a light-emitting optical axis 16 of the light-emitting unit 15. The arrangement of a light-emitting optical system for performing the active distance measurement is such that the light-emitting optical axis 16 extends in parallel to the light-receiving optical axes 11 and 12 and lies in a plane, which includes the light-receiving optical axes 11 and 12, at a position between the light-receiving optical axis 11 and the imaginary center axis X so that the distance La between the light-emitting optical axis 16 and the light-receiving optical axis 11 is shorter, than the distance between the imaginary center axis X and the light-emitting optical axis 16.

Designated by reference numeral 17 is a shortest distance position at which the light-emitting optical axis 16 intersects with the short-distance light 13. Reference numberals 18, 19 designate reflection beams which are respectively produced by the reflection of the auxiliary light beam 15a on objects (not shown) which are located at the shortest distance position 17 and the limit position 7, respectively.

Further, in FIG. 1, designated by Z2 is a measurable extension range in which the distance to an object can be measured by the active distance measuring operation. Reference numeral 20 designates a first optical path which is defined between the ∞ light beam 9 and the short-distance light 13, while reference numeral 21 designates a second optical path which is defined between the ∞ light beam 10 and the short-distance light 14.

Figure 2:
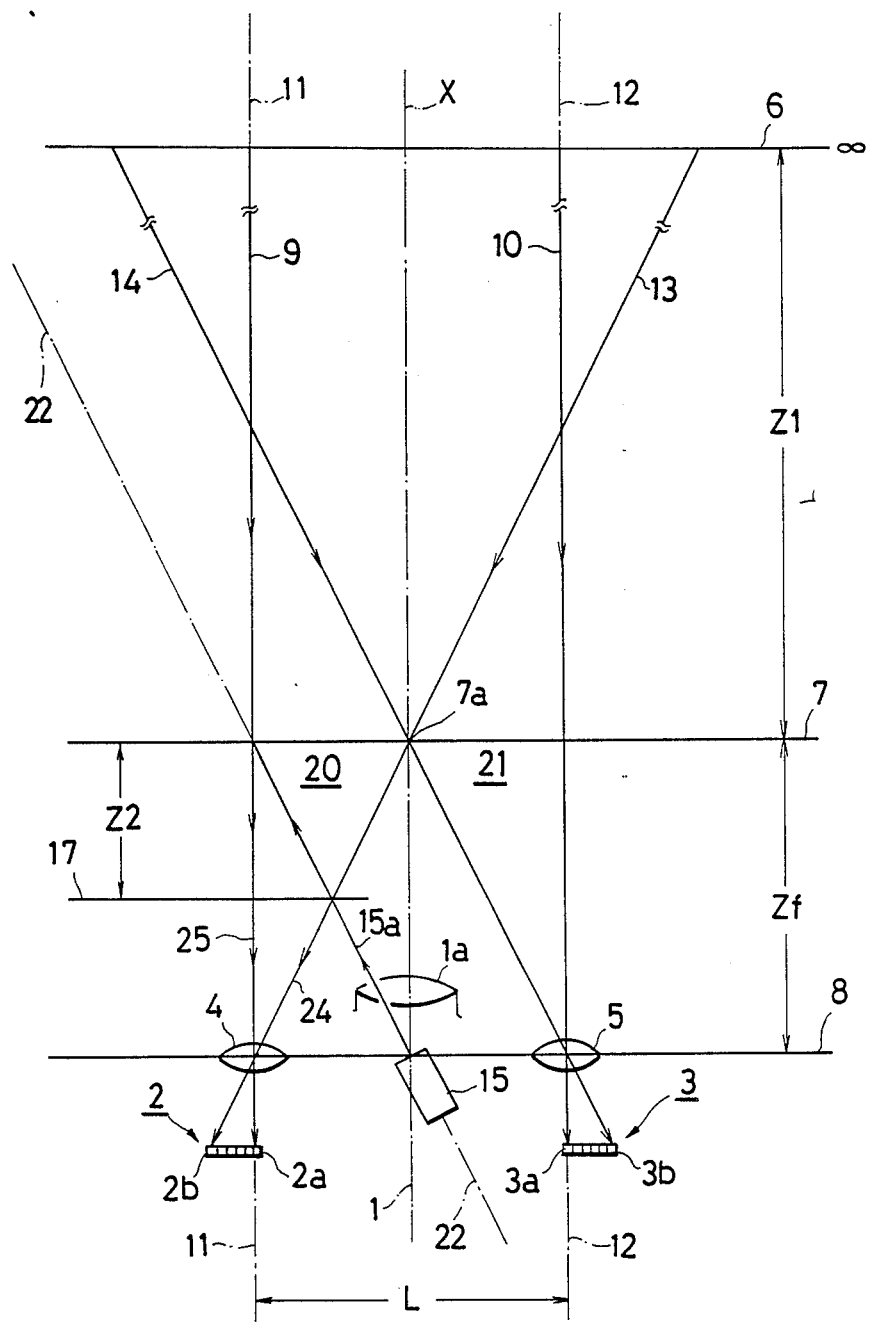
FIGS. 2 and 3 are diagrammatic plan views of a distance measuring apparatus according to second and third embodiments of the invention, respectively.
Figure 3:
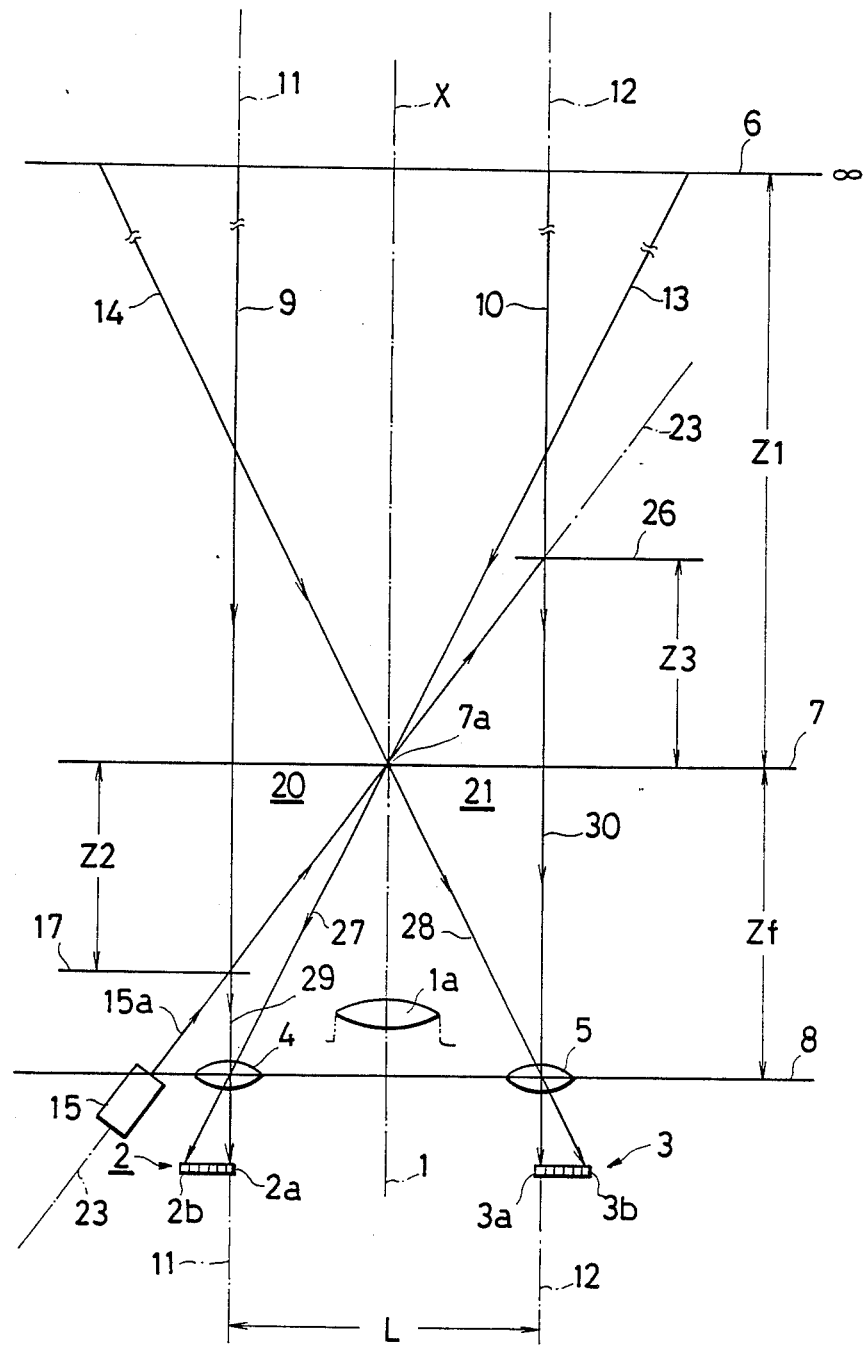

FIGS. 2 and 3 are plan views diagrammatically illustrating the whole structure of distance measuring apparatuses according to second and third embodiments of the present invention, respectively. The construction of a light-receiving optical system in each of the second and third embodiments is the same as that of the above-described first embodiment. However, the arrangement of a light-emitting unit 15 for emitting an auxiliary light beam 15a in each of the second and third embodiments is different from that of the first embodiment.

In FIGS. 2 and 3, reference numerals 22 and 23 designate light-emitting optical axes of the light-emitting unit 15, respectively, along each of which the auxiliary light beam 15a is emitted from the light-emitting unit 15. Similarly to the light-emitting optical axis 16 of the first embodiment, each of the light-emitting optical axes 22 and 23 lies in a plane which includes the light-receiving optical axes 11 and 12 of the lenses 4 and 5.

In the second embodiment shown in FIG. 2, the construction of a light-emitting optical system is such that the light-emitting optical axis 22 intersects with the first optical path 20 in the state that the light-emitting optical axis 22 intersects obliquely with the light-receiving optical axis 11 of the light-receiving optical system. On the other hand, in the third embodiment shown in FIG. 3, the construction of a light-emitting optical system is such that the light-emitting has a disadvantage in that due to optical paths 20 and 21 in the state that the light-emitting optical axis 23 intersects obliquely with the light-receiving optical axes 11 and 12 of the light-receiving optical system. More specifically, in the second embodiment shown in FIG. 2, the light-emitting unit 15 is disposed between the two lenses 4 and 5 in such a manner that the light-emitting optical axis 22 intersects with the light-receiving optical axis 11 and thus intersects with the ∞ light beam 9 at the limit position 7. On the other hand, in the third embodiment shown in FIG. 3, the light-emitting unit 15 is disposed at the outside of the lens 4, i.e., the left side of the lens 4, seen in FIG. 3, in such a manner that the light-emitting optical axis 23 passes through the limit point 7a.

In FIG. 2, reference numerals 24 and 25 designate reflection beams which are respectively produced by the reflection of the auxiliary light beam 15a effected on objects (not shown) which are located at the shortest distance position 17 and the limit position 7, respectively.

On the other hand, in FIG. 3, reference numeral 26 designates a medium distance position which exists in the distance-measurable range Z1 with a relatively short distance from the limit position 7, and reference numerals 27 and 28 designate reflection beams which are respectively produced by the reflection of the auxiliary light beam 15a effected on an object located at the limit point 7a, while reference numerals 29 and 30 designate reflection beams which are respectively produced by the reflection of the auxiliary light beam 15a effected on objects (not shown) which are located at the shortest distance position 17 and the medium distance position 26, respectively.

Figure 4:
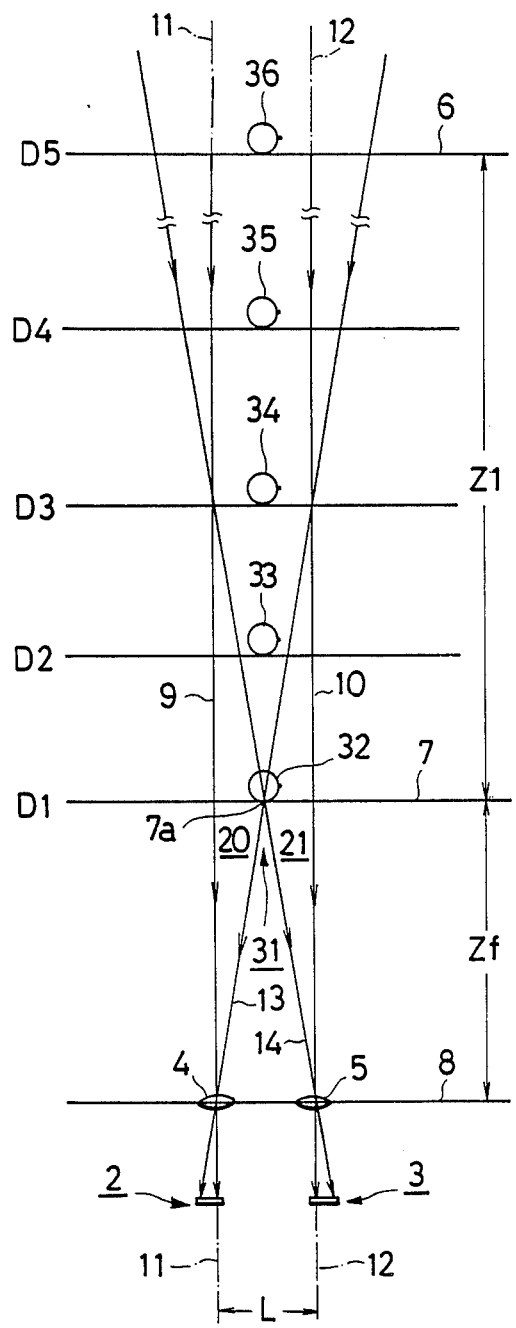
FIGS. 4 to 6 are diagrammatic views each for explaining the principle of a passive distance-measuring process in the first, second and third embodiments of the invention.
Figure 5:
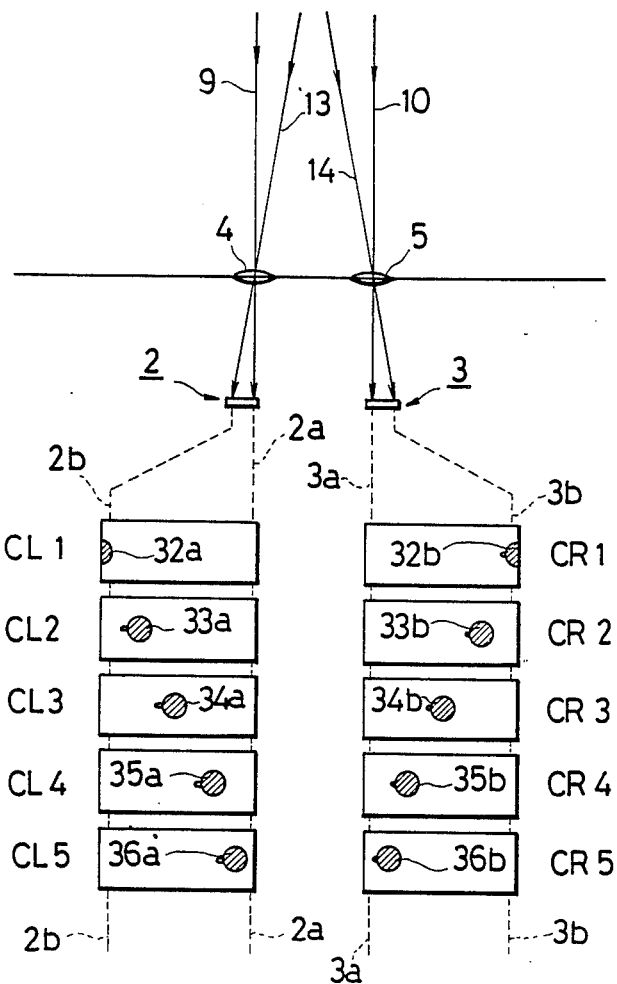
Figure 6:
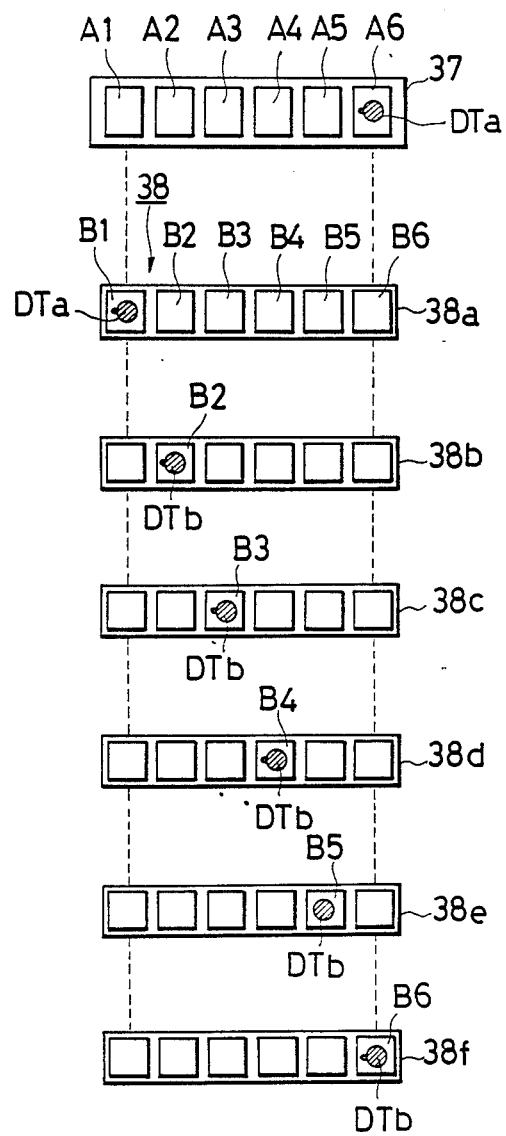

FIGS. 4 to 6 are diagrammatic views each for explaining the principle of the passive distance-measuring process in the above-described first, second and third embodiments of the present invention. In FIG. 4, reference numerals 32 to 36 designate exemplary objects to be photographed, and D1 to D5 designate object distances to the objects 32 to 36, respectively. The object distances D1 and D5 are substantially equal to the distances to the limit position 7 and the ∞ position 6, respectively. Although the imaginary center axis X illustrated in FIGS. 1 to 3 is not shown in FIG. 4, it is assumed that the respective objects 32 to 36 are located on the imaginary center axis.

In FIG. 5, CL1 to CL5 and CR1 to CR5 designate overall images formed on the sensor arrays 2 and 3, respectively, when images 32a to 36a of the objects 32 to 36 are respectively created in focus on the sensor arrays 2 and 3 by the imaging action of the lenses 4 and 5.

In FIG. 6, reference numeral 37 designates a reference memory comprised of six areas A1 to A6 which are correspond to the six picture elements of the sensor array 2, and DTa designate a reference image data which corresponds to the image 36a of the object 36. Further, in FIG. 6, reference numeral 38 generally designates a shift register comprised of six areas B1 and B6 which are correspond to the six picture elements of the sensor array 3, respectively, and DTb designate a comparison image data which corresponds to the image 36b of the object 36. Further, reference numerals 38a to 38b designate individual states of the shift register 38.

Figure 7:
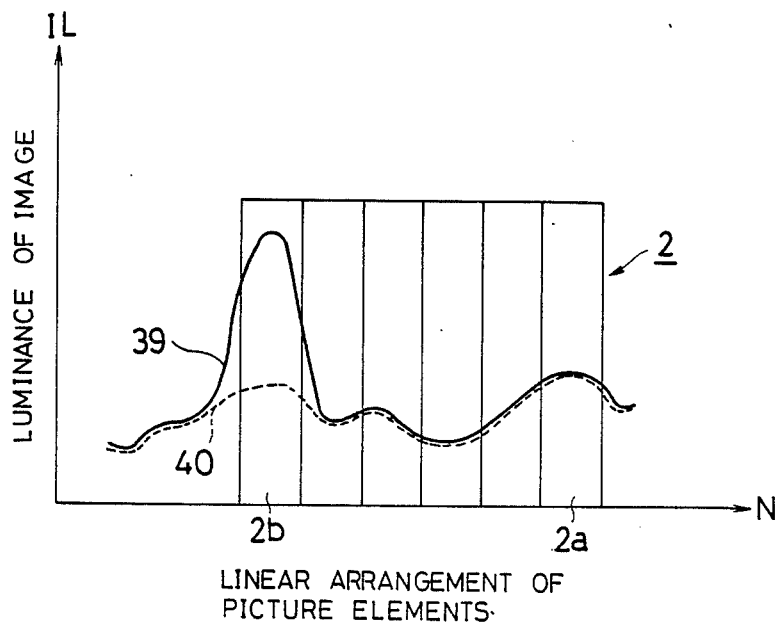
FIG. 7 is a graph showing an example of luminance distributions of an image incident on a sensor array with respect to the linear arrangement of picture elements in the sensor array, which is obtained by an active distance-measuring process in the first, second and third embodiments of the invention.

FIG. 7 shows an example of luminance distributions of an image incident on the sensor array 2, which is obtained by the active distance-measuring process in the first, second and third embodiments of the present invention. In FIG. 7, the vertical axis IL represents the lumnance of an image incident on the sensor array 2, while the horizontal axis N corresponds to the linear arrangement of the six picture elements of the sensor array 2.

In FIG. 7, a first luminance distribution designated by reference numeral 39 is obtained when the sensor array 2 receives any one of the reflection lights 18, 24, and 27, and a second luminance distribution designated by reference numeral 40 is obtained without the use of the auxiliary light beam 15a.

Explanation will now be made as to the operation of the above-described embodiments. First, the passive distance-measuring operation will be explained with reference to FIGS. 4 to 6.

As shown in FIG. 4, in the case that the object distance D1 to the object 32 is intended to be measured, a light beam 13 reflected from the center of the object 32 passes through the lens 4 and is then incident on the picture element 2b located at the outer end (the left end in FIG. 4) of the sensor array 2. In this case, only the left half of the object 32 is located in the optical path 20, as shown in FIG. 4. Accordingly, the image 32a of only the left half of the object 32 is formed in focus on the sensor array 2, as illustrated in the overall image CL1 shown in FIG. 5.

Similarly, in the case of the object 32, since only the right half of the object 32 is located in the optical path 21, as shown in FIG. 4. Accordingly, the image 32b of only the right half of the object 32 is formed in focus on the sensor array 3, as illustrated in the overall image CR1 shown in FIG. 5.

Next, in the case that the object distance D2 to the object 33 is intended to be measured, since the whole of the object 33 is located in each of the optical paths 20 and 21 at a position close to the light beams 13 and 14, as shown in FIG. 4, the images 33a and 33b of the object 33 are formed in focus on the sensor arrays 2 and 3, respectively, at positions which are slightly apart inwardly from the outer ends of the sensor arrays 2 and 3, respectively, as illustrated in the overall images CL2 and CR2 shown in FIG. 5.

Further, in the case that the object distance D3 to the object 34 is intended to be measured, since the object 34 is located at the middle of each of the optical paths 20 and 21, as shown in FIG. 4, the images 34a and 34b of the object 34 are formed in focus on the respective centers of the sensor arrays 2 and 3, as illustrated in the overall images CL3 and CR3 shown in FIG. 5.

Similarly, in the case of the object distance D4, the images 35a and 35b of the objects 35 are formed in focus on the sensor arrays 2 and 3 at positions which are more closer to the inner ends of the sensor arrays 2 and 3, respectively, as illustrated in the overall images CL4 and CR4 shown in FIG. 5, and in the case of the object distance D5, the images 36a and 36b of the objects 36 are formed in focus on the sensor arrays 2 and 3 at positions which are furthermore closer to the inner ends of the sensor arrays 2 and 3, respectively, as illustrated in the overall images CL5 and CR5 shown in FIG. 5.

Namely, as apparent from FIG. 5, the images of the object, which are formed on the respective sensor arrays 2 and 3, change in position symmetrically with respect to each other between the inner and outer ends of the sensor arrays, respectively, in accordance with the change of the object distance to the object. Accordingly, in the passive distance measurement, by detecting the distance between the two images (e.g., the images 32a and 32b) formed on the respective sensor arrays 2 and 3, it is possible to measure the object distance to the object between the object distances D1 and D5, i.e., within the distance-measurable range Z1.

As apparent from the above description, if the object distance to the object is shorter than the object distance D1, since the object is out of the optical paths 20 and 21, the reflection beams from the object is caused to come out of the picture elements 2a and 3a located at the outer end of the sensor arrays 2 and 3, respectively. In this case, therefore, the images of the object will not focused in focus on the sensor arrays 2 and 3, respectively. Namely, in the passive distance measurement, it is impossible to measure the object distance to the object when the object is located within the distance-dismeasurable range Zf.

Next, explanation will be made as to the operation for detecting the distance between the two images of the object which are formed on the sensor array 2 and 3. In the following description, for example, it is assumed that the object distance D5 to the object 36 is intended to be measured. In this case, therefore, the images 36a and 36b of the object 36 are formed on the sensor arrays 2 and 3, as illustrated in the overall images CL5 and CR5 shown in FIG. 5.

The overall images CL5 and CR5 are converted to image information data by the picture elements of the sensor arrays 2 and 3, respectively, where the data are stored in the picture elements. Either of the image information data stored in the picture elements of the sensor arrays 2 and 3 are used as reference data. For this purpose, as shown in FIG. 6, the image information data stored in the respective picture elements of the sensor array 2, for example, are transferred to the areas A1 to A6 of the reference memory 37, respectively, and stored therein. Accordingly, the image information data Dta corresponding to the image 36a is stored in the area A6 of the reference memory 37.

On the other hand, the image information data stored in the respective picture elements of the sensor array 3 are transferred to the areas B1 to B6 of the shift register 38, respectively, and stored therein. Accordingly, as illustrated as the state 38a shown in FIG. 6, the image information data Dtb corresponding to the image 36b is stored in the area B1 of the shift register 38. The image information data stored in the respective areas A1 to A6 of the shift register 38 are then compared with the image information data stored in the respective areas B1 to B6 of the reference memory 37, respectively.

Thereafter, the contents of the shift register 38 is shifted by one area, as illustrated as the state 38b shown in FIG. 6. Accordingly, the image information data DTb is shifted from the area B1 to the area B2. At this stage, the image information data stored in the respective areas A1 to A6 of the shift register 38 are compared with the image information data stored in the respective areas B1 to B6 of the reference memory 37, respectively, again.

In this way, the shift of the contents of the shift register 38 and the comparison of the image information data are repeated, as illustrated as the states 38c to 38f shown in FIG. 6. In the state 38f, since the image information data DTb is stored in the area B6 of the shift register 38, the contents of the shift register 38 is coincident with the contents of the reference memory 37. Namely, in this case, the shift register 38 is required for the coincidence of the two image information data to shift the contents thereof five times, which is an allowable maximum number of times, toward the right in FIG. 6. Therefore, it is possible to measure the object distance D5 by previously defining the five times of the shifts toward the right thereof as the ∞ position 6.

Next, explanation will be made as to the active distance-measuring operation of each of the first, second and third embodiments.

In the first embodiment shown in FIG. 1, as described above, when the object is located at the shortest distance position 17 which exists in the distance-dismeasurable range Zf, it is impossible, in the passive distance measurement, to measure the object distance to the object.

In this case, the auxiliary light beam 15a is emitted from the light-emitting unit 15 along the light-emitting optical axis 16. Therefore, when the object is located at the shortest distace position 17 on the light-emitting optical axis 16, the auxiliary light beam 15a is reflected by the object at the shortest distance position 17, and thus the auxiliary light beam 15a reflected, as the reflection beam 18, form the object is incident on the picture element 2b at the outer end of the sensor array 2. On the other hand, when the object is located at the limit position 7 on the light-emitting optical axis 16, the auxiliary light beam 15a is irradiated on the object at the shortest distance position 17, and thus the auxiliary light beam 15a reflected, as the reflection beam 19, form the object is incident on the picture element at substantially the center of the sensor array 2.

Accordingly, within the measurable extension range Z2, the object distance to the object can be measured by the active distance measuring operation. In addition, when the object is located in place within the distance-measurable range Z1, the object distance to the object can be also measured by the active distance measuring operation, as far as the auxiliary light beam 15a can be incident on the sensor array 2 after being reflected by the object.

Explanation will now be made in detail as to the principle of the active distance measurement by taking the case of the reflection beam 18. In FIG. 7, the luminance distribution 40, which is obtained in the case of absence of the auxiliary light beam 15a (i.e., the reflection beam 18), indicates a relatively small amount of scatter. In comparison to this, the luminance distribution 39, which is obtained in the case of existence of the auxiliary light beam 15a (i.e., the reflection beam 18), indicates a peak portion at the position corresponding to that of the picture element 2b. This means that the reflection beam 18 is incident on the picture element 2b. In this case, since the distance La between the light-receiving optical axis 11 and the light-emitting optical axis 16 is predetermined, it is possible to apply the principle of triangulation to the active distance-measuring method by utilizing the distance La. Namely, the opposite picture elements 2b and 2a are previously defined as the shortest distance position 17 and the ∞ position 6, respectively, and other picture elements between the opposite picture elements 2b and 2a are also previously defined as appropriate object distances. Accordingly, it is possible to detect the object distance to the object by checking a picture element indicating a highest luminance.

As apparent from the above description, in the first embodiment, since the light-emitting optical axis 16 of the light-emitting optical system is spaced with the distance La form the light-receiving optical axis 11 of the light-receiving optical system for performing the passive distance measurement, the distance-measurable range is enlarged by the measurable extension range Z2 toward the shorter distance side of the limit position 7 over the distance-measurable range Z1. Namely, the distance-dismeasurable range Zf, which occurs in the passive distance measurement, can be covered by the measurable extension range Z2.

Further, in the first embodiment, even through an object to be photographed is far away from the limit position 7, it is also possible to measure the distance to the object by the active distance measuring operation as far as the auxiliary light beam 15a can be detected after being reflected by the object. Accordingly, with the active distance-measuring operation, it is possible to reliably measure the distance to an object having a property in that an image detected therefrom has relatively low contrast or luminance which causes the passive distance measurement to be difficult.

On the other hand, in the second embodiment shown in FIG. 2, the reflection beam 25 reflected from the object located at the limit position 7 and the reflection beam 24 reflected from the object located at the shortest distance position 17 are incident on the picture elements 2b and 2a, respectively. Accordingly, the whole of the reflection beams from the objects located in the measurable extension range Z2 can be detected by the sensor array 2. In this case, therefore, by defining the picture elements 2b and 2a as the shortest distance position 17 and the limit position 7, respectively, it is possible to detect the object distance to the object located between the shortest distance position 17 and the limit position 7.

Namely, in the second embodiment shown in FIG. 2, as like as the first embodiment, the distance-measurable range is enlarged by the measurable extension range Z2 toward the shorter distance side of the limit position 7 over the distance-measurable range Z1, by virtue of the active distance measurement.

Further, in the second embodiment, since the light-emitting optical axis 22 of the light-emitting optical system is so arranged as to intersect with the optical path 20 of the light-receiving optical system for performing the passive distance measurement in the state that the light-emitting optical axis 22 intersects obliquely with the light-receiving optical axis 11 of the light-receiving optical system, it is possible to utilize all the picture elements between the inner and outer ends of the sensor array 2, for the purpose of detection of the object distance to the object within the measurable extension range Z2. Accordingly, the second embodiment has an advantage in that the object distance within the measurable extension range Z2 can be measured with resolution which is higher than that obtained by the first embodiment.

On the other hand, in the third embodiment shown in FIG. 3, the reflection beam 29 reflected from the object located at the shortest distance position 17 is incident on the picture element 2a located at the inner end of the sensor array 2, and the reflection beam 27 reflected from the object located at the limit position 7 is incident on the picture element 2b located at the outer end of the sensor array 2, while the reflection beam 30 reflected from the object located at the medium distance position 26 in incident on the picture element 3a located at the inner end of the sensor array 3, and the reflection beam 28 reflected from the object located at the limit position 7 is incident on the picture element 3b located at the outer end of the sensor array 3.

In this case, therefore, by defining the picture elements 2b and 2a as the limit position 7 and the shortest distance position 17, respectively, the object distance to the object within the measurable extension range Z2 can be detected by the sensor array 2. Further, by defining the picture elements 3a and 3b as the medium distance position 26 and the limit position 7, respectively, the object distance to the object within a common range Z3 between the medium distance position 26 and the limit position 7 can be detected by the sensor array 3.

As apparent from the above description, in the third embodiment shown in FIG. 3, as like as the first and second embodiments, the distance-measurable range is enlarged by the measurable extension range Z2 toward the shorter distance side of the limit position 7 over the distance-measurable range Z1, by virtue of the active distance measurement.

Further, in the third embodiment, since the light-emitting optical axis 23 of the light-emitting optical system is so arranged as to intersect with the optical paths 20 and 21 of the light-receiving optical system for performing the passive distance measurement in the state that the light-emitting optical axis 23 intersects obliquely with the light-receiving optical axes 11 and 12 of the light-receiving optical system, it is possible to utilize all the picture elements between the inner and outer ends of the sensor array 2, for the purpose of detection of the object distance to the object within the measurable extension range Z2. Accordingly, as like as the second embodiment, the third embodiment also has an advantage in that the object distance within the measurable extension range Z2 can be measured with resolution which is higher than that obtained by the first embodiment.

Furthermore, in the third embodiment, since all the picture elements between the inner and outer ends of the sensor array 3 can be utilized for the detection of the object distance to the object within the common range Z3, it is possible to detect the object distance within the common range Z3 with high resolution, by virtue of the active distance measurement. In addition, since the common range Z3 exists within the distance-measurable range Z1, the active distance-measuring system also serves to cover the above-mentioned inherent deficiency of the passive distance-measuring system.

In the above-described first, second and third embodiments, since the light-receiving optical system and the sensor arrays 2 and 3 used for the passive distance measurement are also used for the active distance measurement, it is only necessary for the active distance measurement to additionally provide the light-emitting unit 15. This means that the distance measuring apparatus having a simple construction can be fabricated without causing it to increase in size.

Further, in the first, second and third embodiments, the distance measuring apparatus can perform both the passive distance measurement and the active distance measurement. In this case, the passive distance-measuring system has an inherent advantage in that it can cover a wide distance-measurable range such as the range Z1. Accordingly, in the distance measuring apparatus of the first, second and third embodiments, it is possible to widen the distance-measurable range up to the shortest distance position 17 within the distance-dismeasurable range Z2 while making full use of the advantage of the passive distance-measuring system.

Although in the first and second embodiments shown in FIGS. 1 and 2, the arrangement of the light-emitting unit 15 is such that the light beam 15a emitted therefrom is detected as the reflection beam 18, 19, 24, or 25 by the sensor array 2 after being reflected by the object, it is possible to arrange the light-emitting unit so that the reflection beam 18, 19, 24, or 25 can be detected by the sensor array 3.

Further, in the foregoing embodiments, for the sake of easy understanding of the invention, it has been assumed that each of the sensor arrays has six picture elements. The number of picture elements in each of the sensor arrays 2 and 3 may be increased in consideration of good balance between the manufacturing cost thereof and a desirable measuring accuracy (resolution).

Further, although in the above-described particular embodiment, the reference memory 37 and the shift register 38 are used for detecting the distance between the two images formed on the sensor arrays 2 and 3, as illustrated in FIG. 6, the distance measuring apparatus may be constructed so as to directly compare data at every address of the picture elements of the respective sensor arrays by the use of a microcomputer.

On the other hand, it is assumed, in the foregoing explanation regarding the passive distance measurement, that only one of the picture elements corresponds to the image of the object (for example, the image 36a or 36b). However, in practice, the image of the object 36a or 36b is often caught by a plurality of picture elements as one group. For example, each sensor array having sixty-four picture elements may be divided into a plurality of blocks or groups in which six groups include ten picture elements, respectively. In this case, when the image 36a of the object is formed in focus on only the five picture elements in the same group for example, it is assumed that the image is detected by the group, even if the image is formed on any place in the same group. Such a image detecting system will be referred to as group detection system, herein after.

Figure 8:
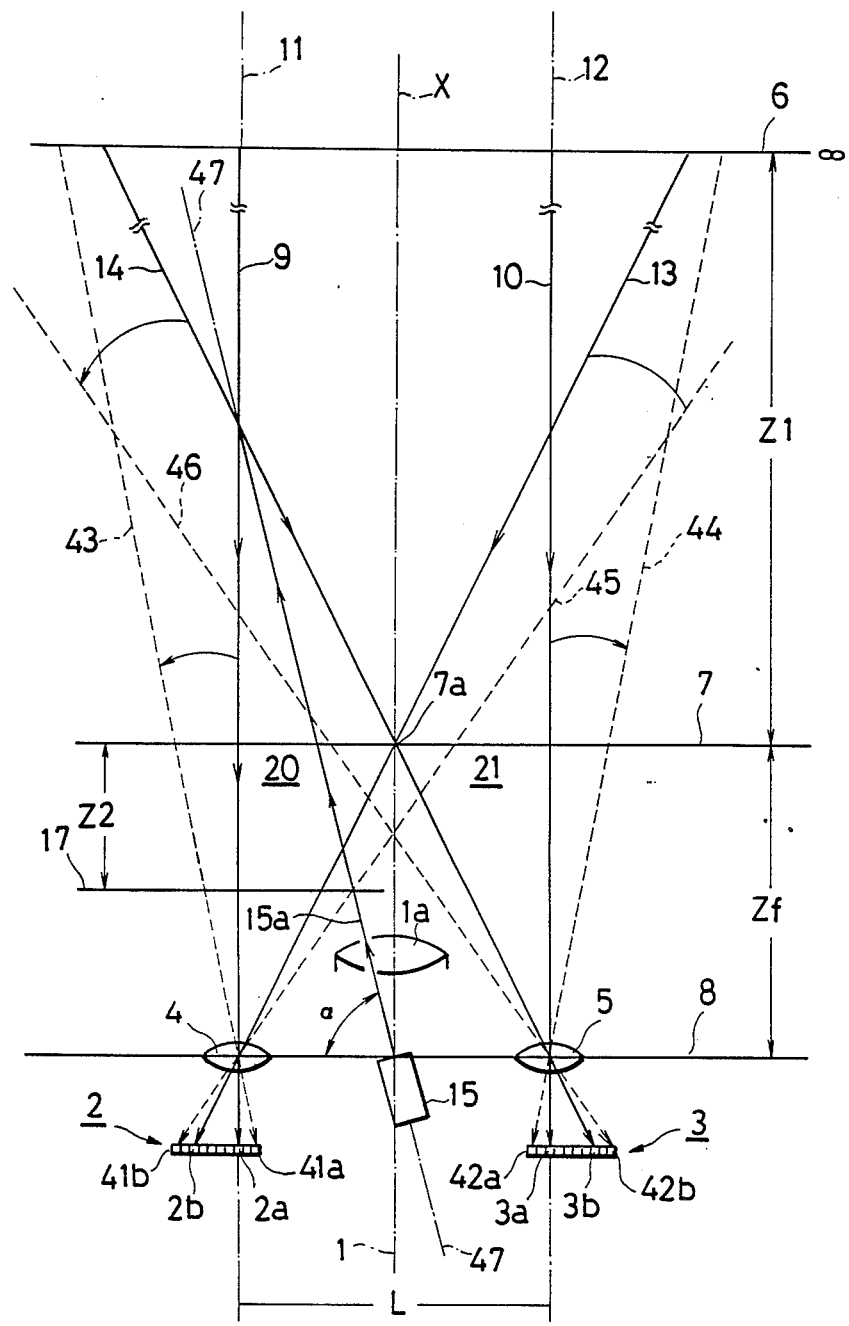
FIG. 8 is a diagrammatic plan view of the whole structure of a distance measuring apparatus according to a fourth embodiment of the invention, which is similar to the second embodiment shown in FIG. 2 except that modifications are made in the arrangement of a light-emitting optical axis of a light-emitting unit.

FIG. 8 shows a fourth embodiment of the present invention, in which the above-mentioned group detection system is applied to the sensor arrays 2 and 3. In this embodiment, the real physical size of each of the sensor arrays 2 and 3 is determined by the respective opposite picture elements 2a and 2b and 3a and 3b, as like as the second embodiment shown in FIG. 2. However, the group detection system enables the sensor arrays 2 and 3 to be seemingly enlarged up to respective imaginary opposite picture elements 41a and 41b and 42a and 42b.

As shown in FIG. 8, in the fourth embodiment, light beams 43 and 45 are capable of being incident on the opposite picture elements 41a and 41b of the sensor array 2, respectively. Similarly, light beams 44 and 46 are capable of being incident on the opposite picture elements 42a and 42b of the sensor array 3, respectively. Namely, the light-receiving angular range of the distance measuring apparatus is enlarged.

In the above-mentioned construction of the fourth embodiment, therefore, the light-emitting unit 15 may be arranged so that a light-emitting optical axis 47 emitted from therefrom passes through the limit position 7 at a point between the light-receiving optical axis 11 and the imaginary center axis X, as shown in FIG. 8, rather than the point of intersection of the light-receiving optical axis 11 with the limit position 7 as shown in FIG. 2.

In this case, when the second and fourth embodiments have the same measurable extension range Z2, it is possible in the fourth embodiment to increase the angle $\alpha$ of the light-emitting optical axis 47 with respect to the reference position 8, in comparison to that of the second embodiment. This means that the object distance to an object within the distance-measurable range Z1 can be measured by the active distance measuring operation using the auxiliary light beam 15a.

Accordingly, as like as the third embodiment shown in FIG. 3, the active distance-measuring system in the fourth embodiment also serves to cover the inherent deficiency of the passive distance-measuring system.

Of course, the above-described group detection system can also be applied to the third embodiment, in this case, it is possible to increase the common range Z3.

While the invention has been described in conjunction with specific embodiments thereof, it is evident that many alternatives and modifications will be apparent to those skilled in the art in light of the foregoing description. Accordingly, it is intended to include all such alternatives and modifications as fall within the spirit and scope of the appended claims.

What is claimed is:

1. A distance measuring apparatus of a camera for performing a passive distance measurement and an active distance measurement, comprising:

a pair of light-detecting elements each having a light-receiving portion, which are symmetrically arranged with respect to an imaginary center axis and perpendicularly thereto;

a pair of light-receiving optical systems for forming images of an object, which is to be photographed, in focus on the respective light-receiving portions of the light-detecting elements, the light-receiving optical systems being adapted to define symmetrical light-receiving optical paths, respectively, so that a pair of first light beams transmitted from infinity can be symmetrically incident on the light-receiving portions of the light-detecting elements at one of opposite ends thereof, respectively, and so that a pair of second light beams transmitted from a limit position which defines a shortest object distance, which is measurable by the passive distance measurement, are incident on the light-receiving portions of the light-detecting elements at the other ends thereof, respectively; and a light-emitting unit for emitting an auxiliary light beam toward the object so that the auxiliary light beam reflected by the object can be detected by at least either of the light-detecting elements, the light-emitting unit having a light-emitting optical axis which is arranged in a plane include light-receiving optical axes of the light-receiving optical systems so that it passes through the limit position in at least either of the light-receiving optical paths, the light-emitting unit being disposed apart from the either of the light-detecting elements in a direction intersecting the imaginary center axis so as to perform the active distance measurement when the object is positioned within at least a region between the limit position in the passive distance measurement and a predetermined shortest distance position which is between the camera and the object.

2. A distance measuring apparatus according to claim 1, wherein the light-emitting unit is disposed between the light-receiving optical axes of the light-receiving optical systems.

3. A distance measuring apparatus according to claim 2, wherein the light-receiving optical axes of the light-receiving optical systems extend in parallel to the imaginary center axis, the light-emitting unit being arranged so that the light-emitting optical axis thereof extends substantially in parallel to the light-receiving optical axes between one of the light-receiving optical axes of the light-receiving optical systems and the imaginary center axis.

4. A distance measuring apparatus according to claim 2, wherein the light-emitting unit is arranged so that the light-emitting optical axis thereof passes through a point of intersection of the limit position and one of the light-receiving optical axes of the light-receiving optical systems.

5. A distance measuring apparatus according to claim 1, wherein the light-emitting unit is disposed out of the region between the light-receiving optical axes of the light-receiving optical systems.

6. A distance measuring apparatus according to claim 5, wherein the light-emitting unit is arranged so that the light-emitting optical axis thereof passes through a point of intersection of the second light beams.

7. A distance measuring apparatus according to claim 1 further comprising:
a first image-processing means for effecting the passive distance measurement by comparing the images of the object formed on the respective light-receiving portions of the light-detecting elements when the light-emitting unit is de-energized; and
a second image-processing means for effecting the active distance measurement by detecting the position of the auxiliary light beam reflected from the object of the light-receiving portion of at least either of the light-detecting elements when the light-emitting unit is energized.

8. A distance measuring apparatus according to claim 7, wherein each of the light-detecting elements is provided at the light-receiving portion thereof with a plurality of picture elements each for producing a light detecting signal corresponding to the amount of light incident thereon, which are linearly arranged between the opposite ends of the corresponding light-receiving portion.

9. A distance measuring apparatus according to claim 8, wherein the plurality of picture elements are divided into a plurality of blocks so that each of the blocks includes a predetermined number of picture elements, and so that each of the blocks produces the same light detecting signal when the image of the object to be photographed is incident on at least any part of all the picture elements in the same block.

10. A distance measuring apparatus according to claim 11, wherein each of the light-receiving optical systems has an imaging lens which is spaced with a focal length thereof from the light-receiving portion of the corresponding light-detecting element.

* * * * *